US012299440B2

United States Patent
Colas et al.

(10) Patent No.: US 12,299,440 B2
(45) Date of Patent: **\*May 13, 2025**

(54) CONFIGURATION PROPERTIES MANAGEMENT FOR SOFTWARE

(71) Applicant: ADP, Inc., Roseland, NJ (US)

(72) Inventors: Fabrice Colas, Nanterre (FR); Remi Noblet, Nanterre (FR)

(73) Assignee: ADP, Inc., Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,074

(22) Filed: Jan. 19, 2024

(65) Prior Publication Data

US 2024/0345834 A1    Oct. 17, 2024

Related U.S. Application Data

(63) Continuation of application No. 18/103,010, filed on Jan. 30, 2023, now Pat. No. 11,893,383, which is a continuation of application No. 17/116,562, filed on Dec. 9, 2020, now Pat. No. 11,567,758.

(51) Int. Cl.
*G06F 8/71* (2018.01)
*G06F 8/61* (2018.01)
*G06F 8/658* (2018.01)
*G06F 9/445* (2018.01)

(52) U.S. Cl.
CPC ............... *G06F 8/71* (2013.01); *G06F 8/63* (2013.01); *G06F 8/658* (2018.02); *G06F 9/44505* (2013.01)

(58) Field of Classification Search
None
See application file for complete search history.

(56) References Cited

U.S. PATENT DOCUMENTS

| 7,506,337 | B2 | 3/2009 | Iyer |
| 7,890,919 | B1 | 2/2011 | Williams |
| 8,095,911 | B2 * | 1/2012 | Ronen ................ G06F 8/36 |
| | | | 717/121 |
| 9,158,518 | B2 | 10/2015 | Brown et al. |
| 10,241,778 | B2 | 3/2019 | Emeis et al. |

(Continued)

OTHER PUBLICATIONS

International Preliminary Report on Patentability issued in corresponding International Application No. PCT/US2021/071478, dated Jun. 22, 2023 (8 pages).

(Continued)

*Primary Examiner* — Marina Lee
(74) *Attorney, Agent, or Firm* — Foley & Lardner LLP

(57) ABSTRACT

A system, method implemented on a computer system, and computer program product for managing properties of software to be deployed for running on an operations system. A user interface prompts an operator to input property information to define properties of the software. The property information for the properties of the software input by the operator is stored in a properties database. Property information for properties of the software that is stored in the properties database may be displayed on the user interface and changed by the operator. The property information for the properties of the software that is stored in the properties database may be used to deploy the software to the operations system.

20 Claims, 18 Drawing Sheets

(56) References Cited

U.S. PATENT DOCUMENTS

| | | |
|---|---|---|
| 10,592,260 B1 | 3/2020 | Gould et al. |
| 10,785,128 B1 | 9/2020 | Bawcom |
| 11,269,616 B1 | 3/2022 | Schumaker |
| 11,567,758 B2 | 1/2023 | Colas et al. |
| 11,893,383 B2 * | 2/2024 | Colas ................. G06F 8/71 |
| 2006/0253848 A1 | 11/2006 | Mathieu et al. |
| 2007/0271552 A1 | 11/2007 | Pulley |
| 2009/0055735 A1 | 2/2009 | Zaleski et al. |
| 2011/0145748 A1 | 6/2011 | Farver et al. |
| 2011/0161931 A1 | 6/2011 | Camelon et al. |
| 2013/0232480 A1 | 9/2013 | Winterfeldt et al. |
| 2014/0258894 A1 * | 9/2014 | Brown ................. G06F 8/38 |
| | | 715/764 |
| 2015/0074641 A1 * | 3/2015 | Nambiar ............... G06F 8/71 |
| | | 717/121 |
| 2015/0347524 A1 | 12/2015 | Bommireddipalli et al. |
| 2018/0253296 A1 | 9/2018 | Brebner et al. |
| 2019/0129701 A1 | 5/2019 | Hawrylo et al. |
| 2021/0279066 A1 * | 9/2021 | Xiao ................. G06F 9/45508 |

OTHER PUBLICATIONS

International Search Report and Written Opinion issued in corresponding International Application No. PCT/US2021/071478, dated Jan. 10, 2022 (14 pages).

Non-Final Office Action issued in corresponding U.S. Appl. No. 18/103,010, dated May 25, 2023 (29 pages).

US Notice of Allowance issued in corresponding U.S. Appl. No. 18/103,010, dated Sep. 28, 2023 (9 pages).

US Notice of Allowance issued in corresponding U.S. Appl. No. 17/116,562, dated Oct. 27, 2022 (9 pages).

US Office Action issued in corresponding U.S. Appl. No. 17/116,562, dated Aug. 11, 2022 (23 pages).

* cited by examiner

800

| Name * | Type * |
|---|---|
| WebService URL | String |

Description

Enum values

Enum value 1

Description http://MyWebService/api/v3

Management    🔍 Search    🔔 Second DPM User ▼

INFO i | PROPERTIES | VERSIONS | INSTANCES | JOB PARAMS

"Shared Component between Team 1/Team2" [Root/Demo]    2266

EDIT   DUPLICATE   RIGHTS   NOTIFICATION

Name

Shared Component between Team 1/Team 2

Description

CONFIGURATION PROPERTIES MANAGEMENT FOR SOFTWARE

BACKGROUND INFORMATION

1. Field

The present disclosure relates generally to systems and methods for the development and deployment of computer programs. More particularly, illustrative embodiments are related to systems, methods implemented in computer systems, and computer program products for managing properties defining the configurations of software for development and deployment.

2. Background

An application is a computer program that is designed to run on a data processing system to perform a group of coordinated functions, tasks, or activities for the benefit of a user. An application also may be referred to as an app, an application program, or a software application.

Middleware is computer software that provides services to software applications beyond those available from a computer operating system. For example, without limitation, middleware may include software that enables communication and management of data in distributed applications.

An organization, such as a business entity or another appropriate organization, may use a variety of different computer software programs, including applications and middleware, to perform a variety of different actions. For example, without limitation, a business organization may use a variety of different applications to perform a variety of different actions related to human capital management or other appropriate business functions. Human capital management also may be referred to as human resource management.

Various software programs may be deployed for use by an organization to provide new functionality, to upgrade or correct errors in software that is already in use, or for other appropriate reasons. The configuration of software deployed or to be deployed for use by an organization may be defined by various parameters. These parameters must be accurately managed to prevent errors during the deployment or operation of software.

Accordingly, it would be beneficial to have a method and apparatus that take into account one or more of the issues discussed above as well as possibly other issues.

SUMMARY

An embodiment of the present disclosure provides an apparatus for managing properties of software comprising a properties database and a user interface generator. The properties database is configured to store property information defining a property of the software. The user interface generator is configured to generate a user interface that: prompts an operator to input the property information to define the property of the software, receives the property information for the property of the software input by the operator, displays the property information for the property of the software that is stored in the properties database, and receives a change from the operator to the property information for the property of the software that is stored in the properties database.

Another embodiment of the present disclosure provides a method implemented in a computer system for managing properties of software. An operator is prompted to input property information to define a property of the software. The property information defining the property of the software input by the operator is received and stored in a properties database. The property information for the property of the software that is stored in the properties database may be displayed. A change by the operator to the property information for the property of the software that is stored in the properties database may be received.

Yet another embodiment of the present disclosure provides a computer program product for managing properties of software. The computer program product comprises a computer readable storage medium having program instructions embodied therewith. The program instructions are executable by a device to cause the device to: prompt an operator to input property information to define a property of the software, receive the property information for the property of the software input by the operator, store the property information defining the property of the software in a properties database, display the property information for the property of the software that is stored in the properties database, and receive a change by the operator to the property information for the property of the software that is stored in the properties database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIGS. 6-10 are examples of user interface displays used in a process for notifying a first operator of a change in a property of software by a second operator in accordance with an illustrative embodiment;

FIGS. 11-15 are examples of user interface displays used in a process for incorporating a change in a property of a first version of software into a second version of the software in accordance with an illustrative embodiment;

DETAILED DESCRIPTION

Figure 1:
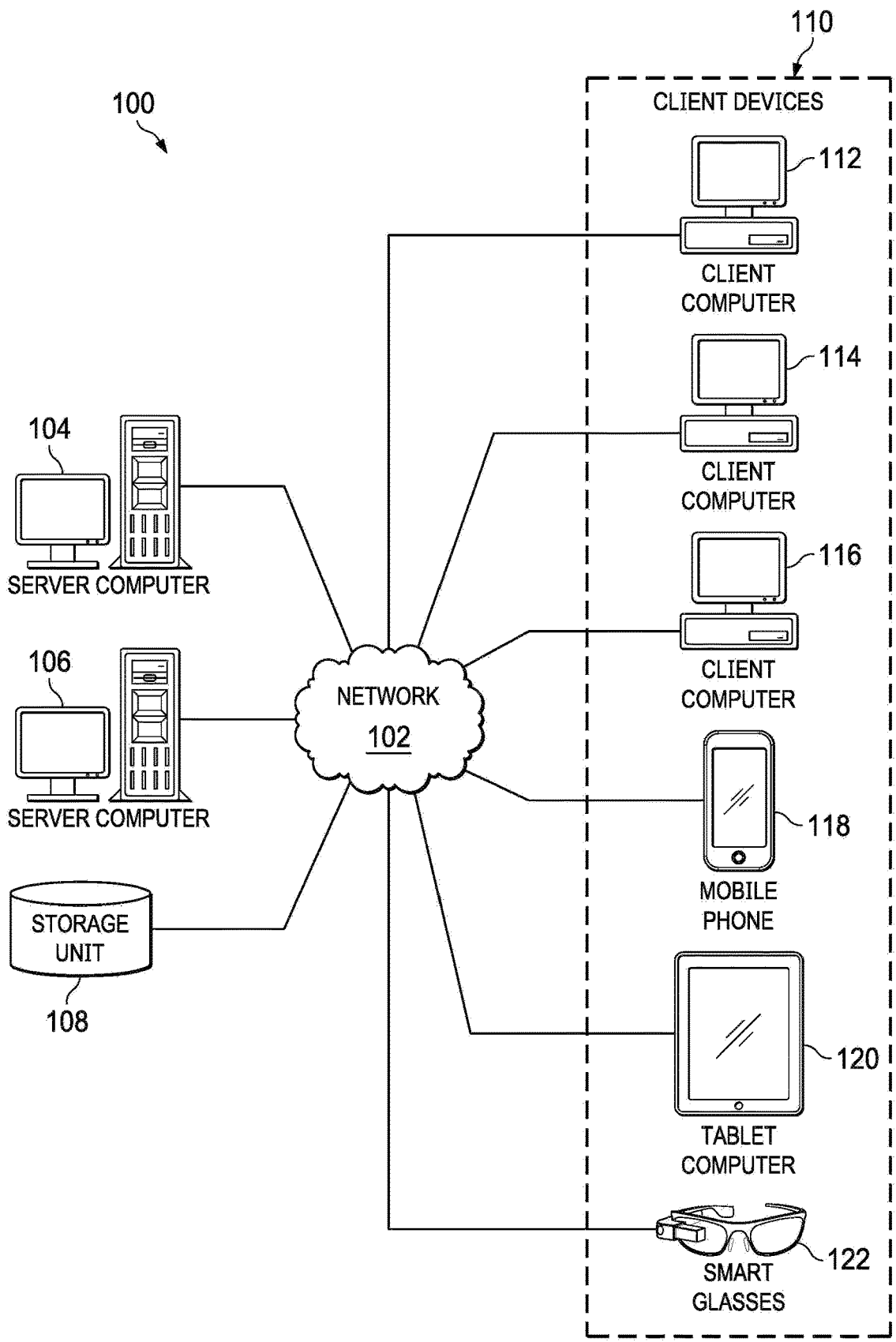
FIG. 1 is a pictorial representation of a network of data processing systems in which illustrative embodiments may be implemented.

The illustrative embodiments recognize and take into account one or more different considerations. For example, the illustrative embodiments recognize and take into account that multiple heterogenous and complex software programs may be used by businesses and other organizations. The effective deployment and operation such software programs may require the manipulation of various properties. Currently, these properties may be recorded and managed in text files. However, the current management of properties in text files may be inaccurate, resulting in errors during software deployment and operation. Furthermore, current systems and methods for managing properties may be inefficient.

Modern day software development and operations practices may include continuous development, continuous testing, continuous integration, continuous deployment, and continuous monitoring of software throughout its lifecycle. These combined practices may be referred to as continuous integration and either continuous delivery or continuous deployment, CI/CD. The effective implementation of CI/CD practices, in particular, may require systems and methods for the management of software properties that are more accurate and efficient than current systems and methods.

The illustrative embodiments provide a system, method implemented in a computer system, and computer program product for managing the properties of software that overcomes the limitations of current systems and methods. Illustrative embodiments facilitate and minimize errors in property management within software development and deployment processes. The improved accuracy and efficiency of property management in accordance with an illustrative embodiment may streamline CI/CD processes for software development and deployment.

Illustrative embodiments provide a user interface for managing the properties of software. The user interface enables an operator to define and store new properties for software and to display and change previously defined and saved properties. Properties for different versions, instances, and job parameters for software may be defined. Illustrative embodiments may also provide for automatically comparing the properties of different versions, instances, or job parameters and displaying an indication of any differences in the properties.

Illustrative embodiments also provide for improved communication and cooperation between software developers and between software development and deployment. For example, developers of shared software may be notified automatically of any detected change to properties of the software. In accordance with another illustrative embodiment, a software developer may be automatically notified of a change to the properties of a piece of software and enabled to automatically incorporate the change into the properties of another piece of software.

Illustrative embodiments centralize the management of properties for software development and operations in a single repository. In accordance with an illustrative embodiment, software properties management is independent from the deployment tool that is used to deploy the software. A properties management system in accordance with an illustrative embodiment may be integrated with software development and deployment systems via exposed application programming interfaces.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As used herein, "a number of" when used with reference to items, means one or more items. For example, "a number of different types of networks" is one or more different types of networks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. As depicted, client devices 110 include client computer 112, client computer 114, and client computer 116. Client devices 110 can be, for example, computers, workstations, or network computers. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
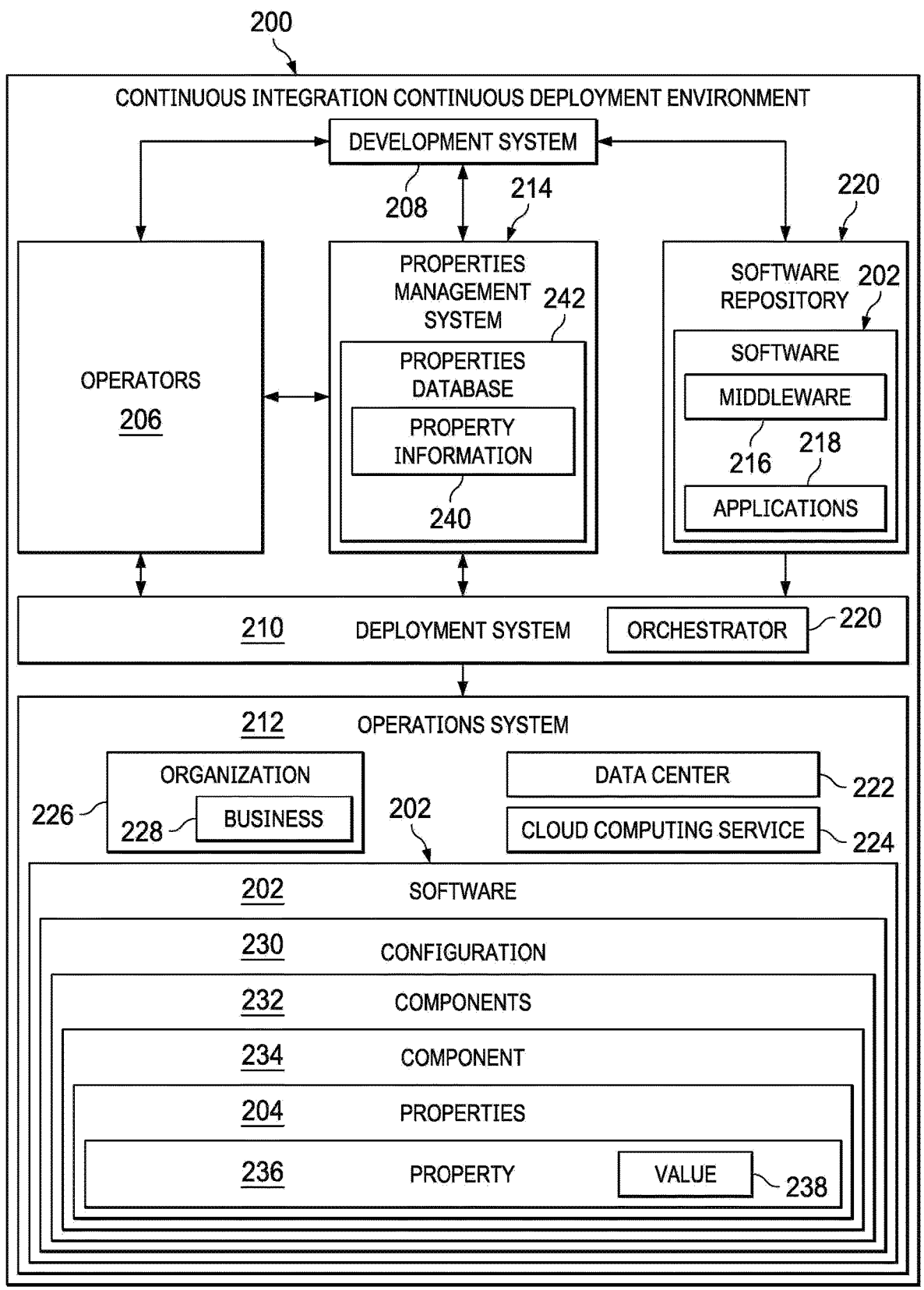
FIG. 2 is an illustration of a block diagram of a continuous integration continuous deployment environment in accordance with an illustrative embodiment.

Turning to FIG. 2, an illustration of a block diagram of a continuous integration continuous deployment environment is depicted in accordance with an illustrative embodiment. Continuous integration continuous deployment environment 200 also may be referred to as a continuous integration continuous delivery environment. Continuous integration continuous deployment environment 200 features the use of continuous integration continuous deployment, CI/CD, processes for the development, deployment, and operation of software 202. Without limitation, illustrative embodiments provide for the management of properties 204 of software 202 in continuous integration continuous deployment environment 200. Illustrative embodiments also may be used for the management of properties of software in other environments for the development, deployment, and operation of software in which CI/CD processes are not used.

Operators 206 in continuous integration continuous deployment environment 200 may use development system 208 to develop software 202 and deployment system 210 to deploy software 202 for running on operations system 212. In accordance with an illustrative embodiment, operators 206 may use properties management system 214 to manage properties 204 of software 202. Operators 206 may be any appropriate human operators of development system 208, deployment system 210, or properties management system 214. Software 202 may include, for example, without limitation, middleware 216, applications 218, or both middleware 216 and applications 218.

Development system 208 may include any appropriate system for developing software 202. Software 202 developed using development system 208 may be stored in any appropriate software repository 220.

Deployment system 210 may include any appropriate system for deploying software 200 from software repository 220 for running on operations system 212. For example, deployment system 210 may include any appropriate orchestrator 220.

Operations system 212 may include any appropriate system for running software 202. For example, without limitation, operations system 212 may be implemented in data center 222, cloud computing service 224, or in another appropriate system or manner to run software 202.

Operations system 212 may be operated by or for organization 226 to run software 202 to perform desired functions for organization 226. For example, without limitation, organization 226 may be business 228 or any other appropriate entity.

Each piece of software 202 running on operations system 212 may include a particular configuration 230 defined by various properties 204. For example, software 202 may include a number of components 232. Each component 234 in number of components 232 may comprise a part or portion of software 202. Each component 234 may include a number of properties 204. Each property 236 in properties 204 may have a particular value 238.

In accordance with an illustrative embodiment, operators 206 may use properties management system 214 to define and manage properties 204 of software 202. For example, during development of software 202, operators 206 may use properties management system 214 to enter and edit property information 240 that defines properties 204 of software 202. Property information 240 may be stored in properties database 242. Property information 240 may be retrieved from properties database 242 for use in deploying software 202 to operations system 212.

The illustration of the different components in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
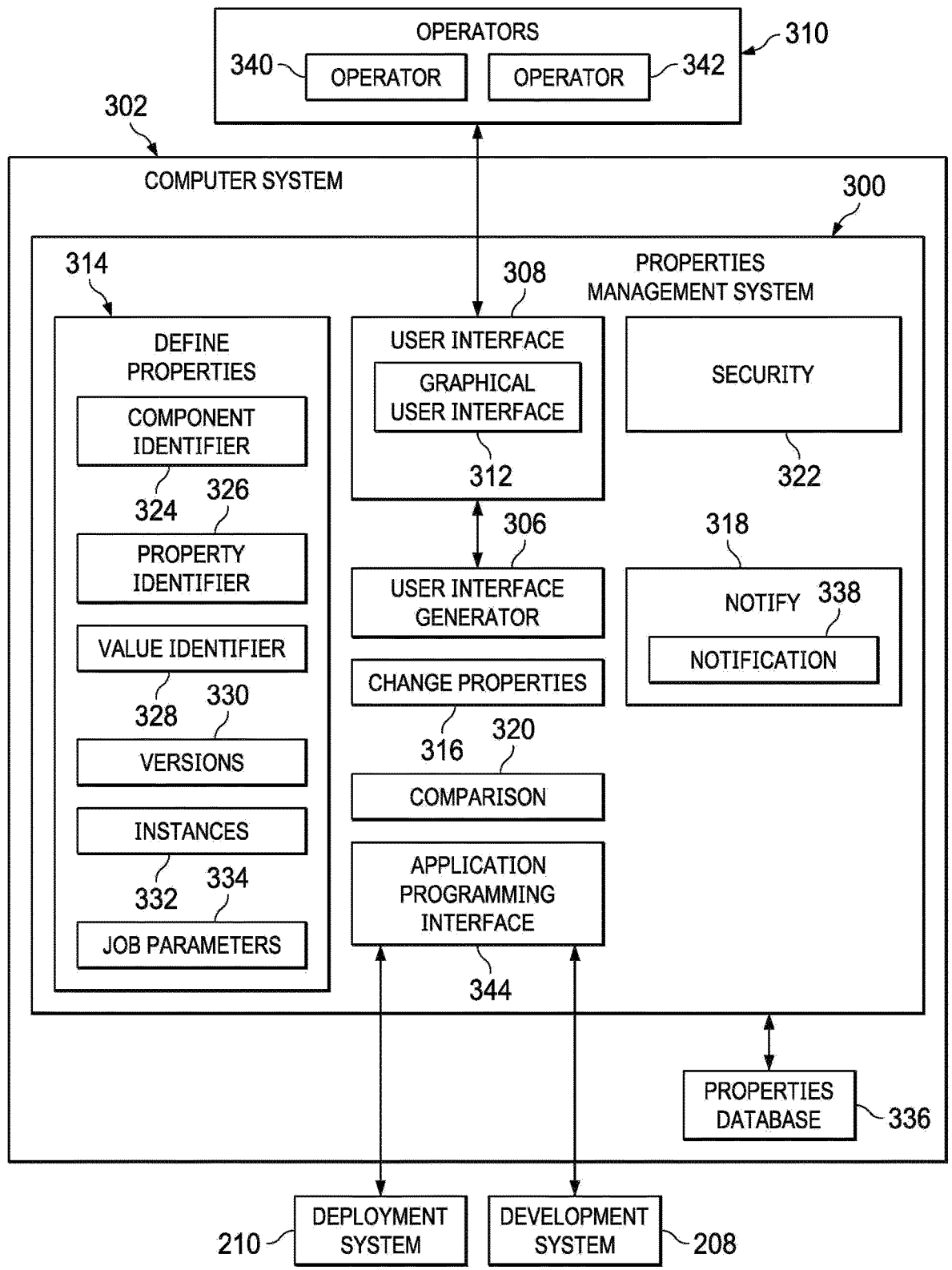
FIG. 3 is an illustration of a block diagram of a properties management system in accordance with an illustrative embodiment.

Turning to FIG. 3, an illustration of a block diagram of a properties management system is depicted in accordance with an illustrative embodiment. Properties management system 300 is an example of one implementation of properties management system 214 in FIG. 2. Properties management system 300 may be implemented in a computer system, such as network data processing system 100 in FIG. 1.

In this illustrative example, properties management system 300 is implemented using computer system 302. Computer system 302 is a physical hardware system and includes one or more data processing systems. When more than one data processing system is present in computer system 302, those data processing systems are in communication with each other using a communications medium. The communications medium can be a network. The data processing systems can be selected from at least one of a computer, a server computer, a tablet computer, or some other suitable data processing system.

Properties management system 300 comprises user interface generator 306. User interface generator 306 is configured to generate user interface 308 whereby operators 310 interact with properties management system 300 to perform various functions. For example, without limitation, user interface 308 may comprise graphical user interface 312.

Properties management system 300 is configured to perform various functions for managing properties of software.

These functions may include, without limitation, define properties 314, change properties 316, notify 318, comparison 320, and security 322.

Define properties 314 includes prompting operators 310 via user interface 308 to enter property information to define properties of software. For example, operators 310 may be prompted to enter component identifier 324 to identify a particular component of the software. Operators 310 then may be prompted to enter property identifier 326 to identify a particular property of the component. Operators 310 also may be prompted to enter value identifier 328 to identify a specific value for the identified property. Operators 310 may define properties 314 for various different versions 330 of components of the software, for different instances 332 of the components, and for various job parameters 334. Property information entered by operators 310 to define properties 314 is stored in properties database 336.

Define properties 314 may also be configured to allow operators 310 to optionally associate a default value with identified properties to create a default template for the properties. A default value may be a value that is used for a property most of the time. Define properties 314 then may be configured to allow operators 310 to use such a template to define properties more quickly. If a default value is associated with a particular property, the default value will be used for the property unless operators 310 override the default value with another value for a particular application. For example, a template may be used to create an instance with default property values. Specific default values then may be changed to customize the instance for a particular application.

Change properties 316 may include displaying property information stored in properties database 336 on user interface 308. Operators 310 then may change the displayed property information to change the properties of the software. The changed property information may then be stored in properties database 336.

Notify 318 includes sending notification 338 to operator 340 when a change is made to a property by another operator 342. The notified operator 340 also may be provided with the option to accept the change to the property into another versions of the software that is maintained by operator 340.

Comparison 320 allows operators 310 to identify different versions 330, instances 332, or job parameters 334 to be compared. Different versions 330, instances 332, or job parameters 334 are automatically compared to identify differences in parameters. An indication of the identified differences in the parameters is displayed on user interface 308.

Security 322 may include any appropriate functionality to limit access to properties management system 300 to authorized operators 310.

Properties management system 300 also may include appropriate application programming interface 344 to allow integration of properties management system 300 with other appropriate systems. For example, without limitation, application programming interface 344 may be configured to provide for integration with deployment system 210, development system 208, or both deployment system 210 and development system 208, as described above with reference to FIG. 2.

The illustration of the different components in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
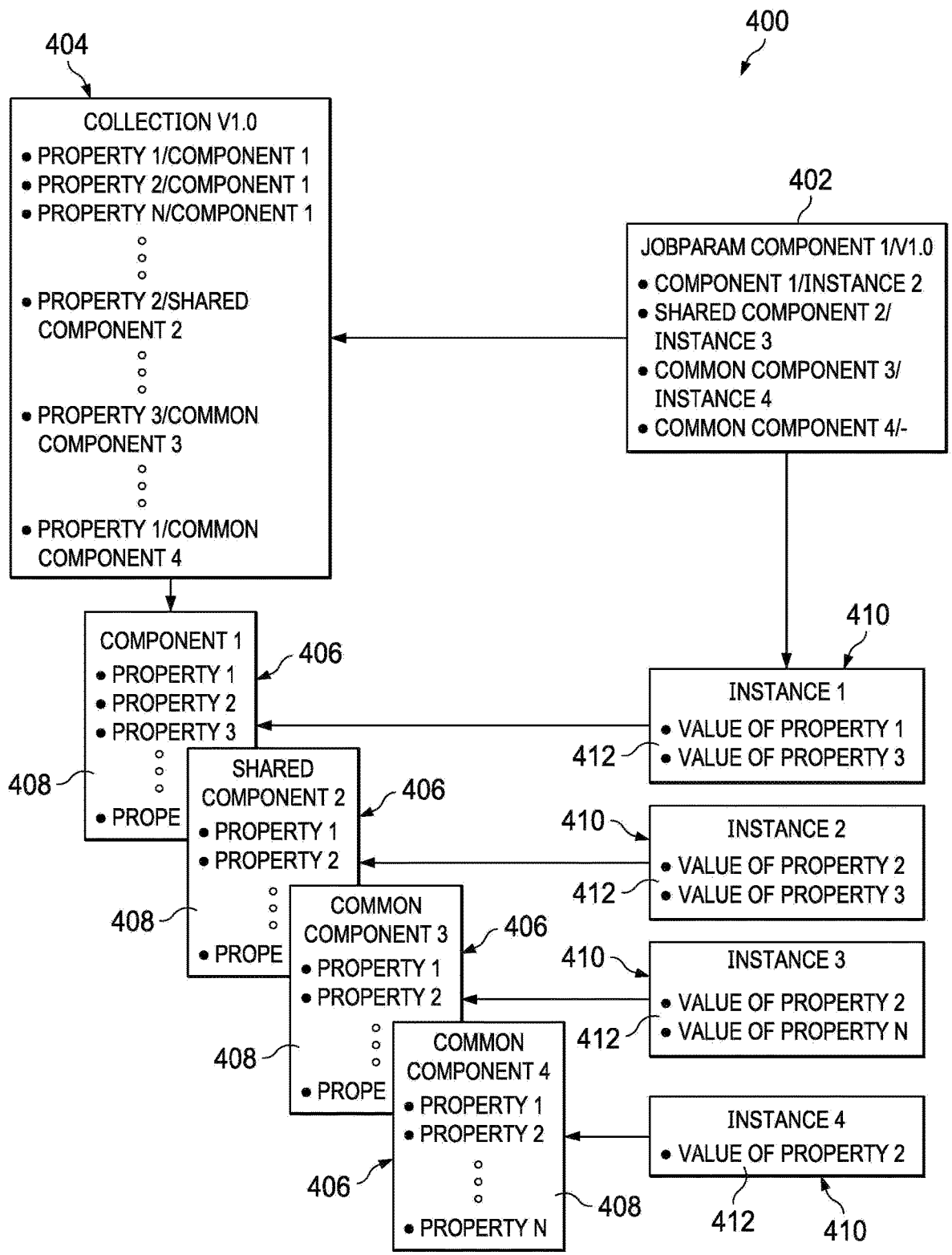
FIG. 4 is an illustration of an example of a structure of properties in accordance with an illustrative embodiment.

Turning to FIG. 4, an illustration of an example of a structure of properties is depicted in accordance with an illustrative embodiment. Structure 400 is an example of a structure of properties of software defined using properties management system 300 in FIG. 3.

Job parameters 402 for a piece of software may be defined by identifying components of the software, including specified versions and instances of the components. The components of the software for a particular version may be defined by collection 404, wherein each component 406 may be defined by a number of properties 408. Each instance 410 specifies values 412 of properties.

Figure 5:
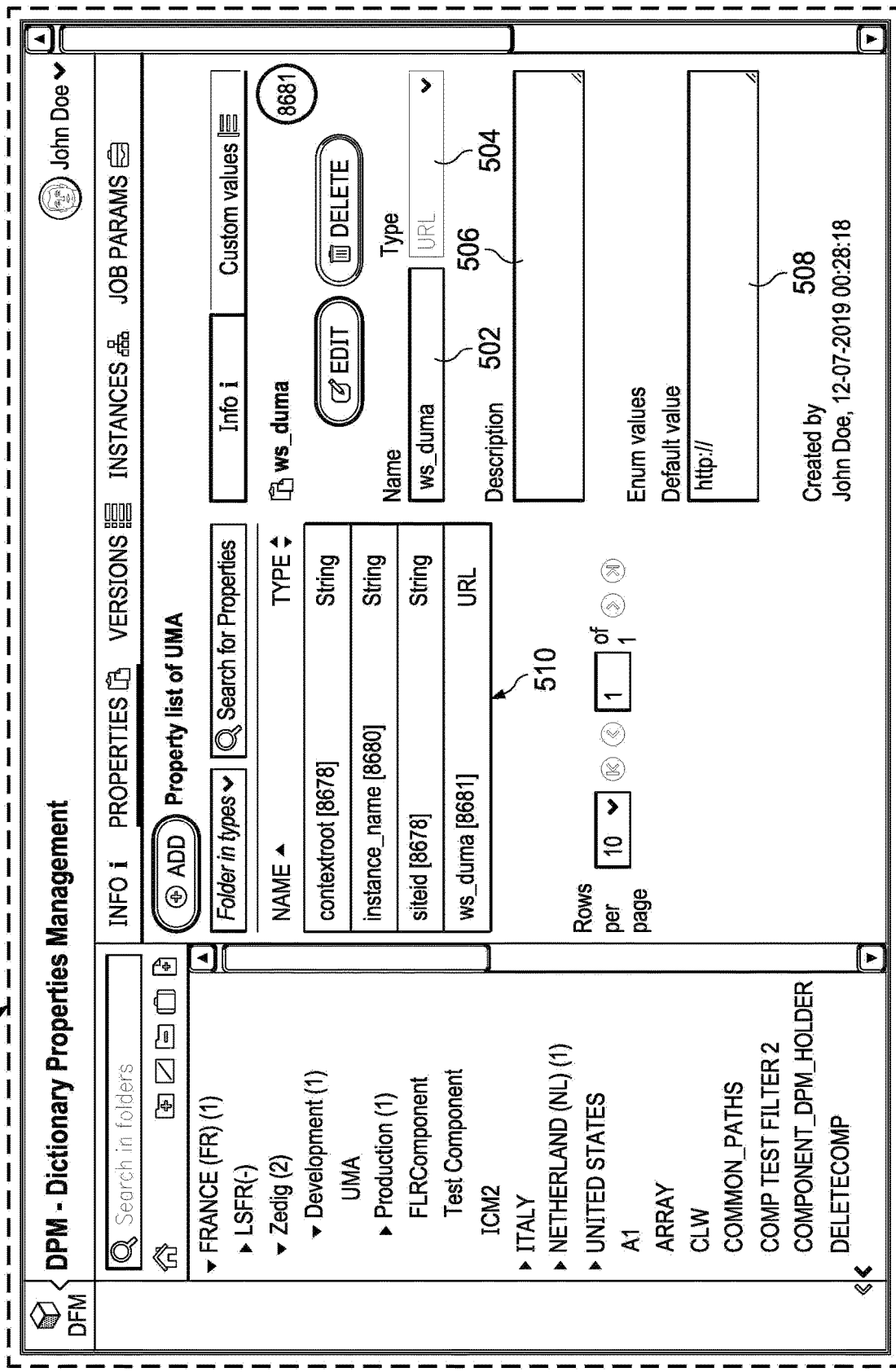
FIG. 5 is an illustration of a user interface display for defining, displaying, and changing property information for properties of software in accordance with an illustrative embodiment.

Turning to FIG. 5, an illustration of a user interface display for defining, displaying, and changing property information for properties of software is depicted in accordance with an illustrative embodiment. Display 500 is an example of one implementation of a display for user interface 308 in FIG. 3.

Display 500 prompts an operator to define a property by entering a name 502 for the property, identifying a type 504 of the property, and providing a description 506 of the property. The operator is also prompted to enter a value 508 for the identified property.

Display 500 also includes a list 510 of the properties that have already been defined. Property information for a property that has already been defined may be changed by selecting the property to be changed from list 510.

Turning to FIGS. 6-10, examples of user interface displays used in a process for notifying a first operator of a change in a property of software by a second operator are depicted in accordance with an illustrative embodiment. Displays 600, 700, 800, 900, and 1000 in FIGS. 6-10 are examples of implementations of displays for user interface 308 in FIG. 3.

Figure 6:
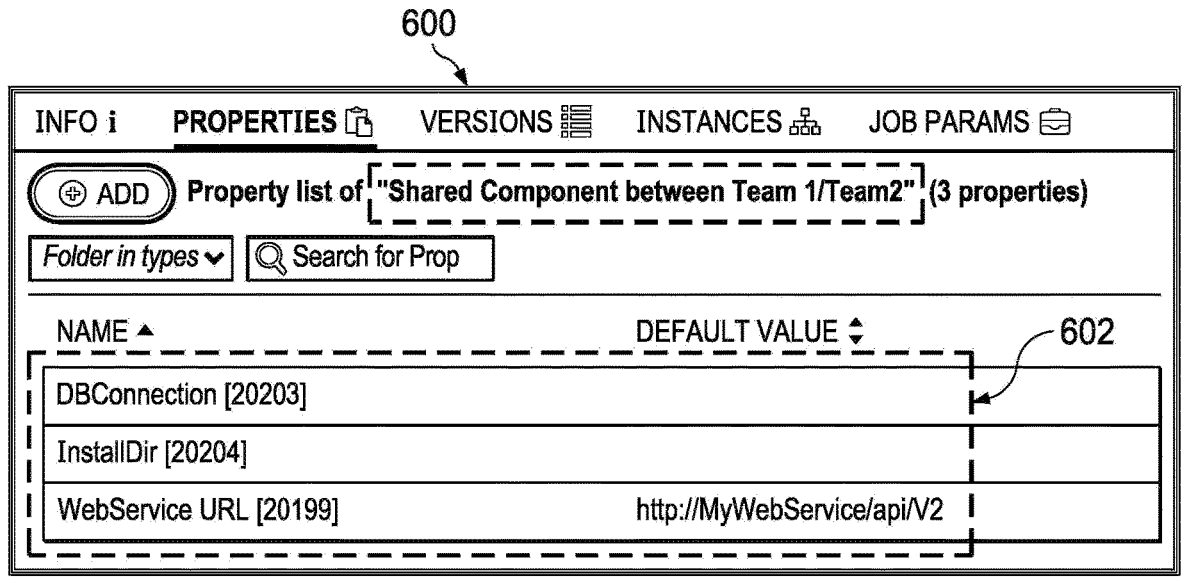
Figure 7:
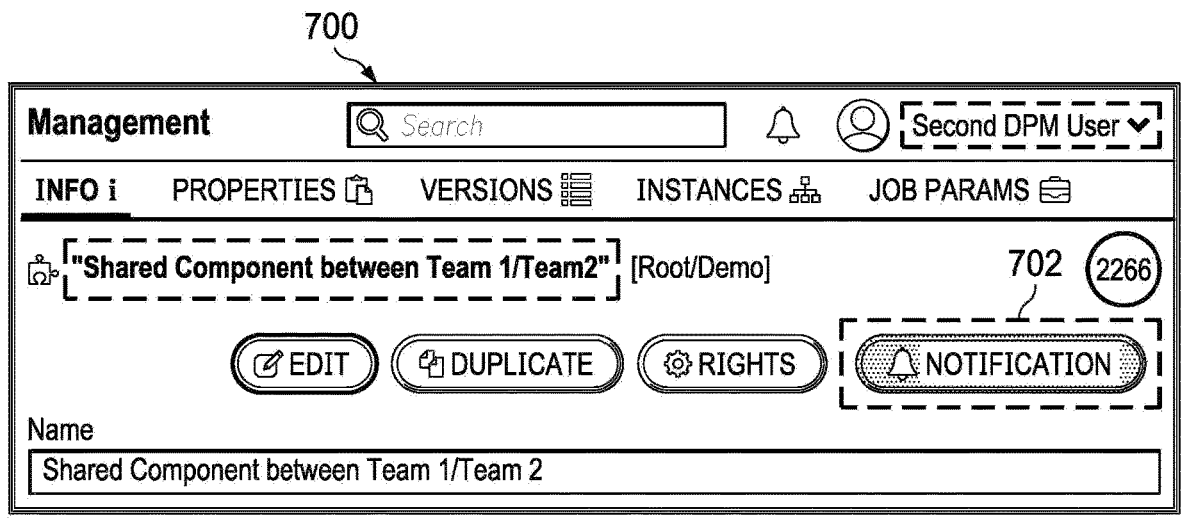
Figure 10:

Display 600 in FIG. 6 shows a list 602 of the properties for software component "Shared Component between Team1/Team2". In display 700 in FIG. 7, operator "Second DPM User" selects notification button 702 to request being notified of a change to the properties of "Shared Component between Team1/Team2". In display 800 in FIG. 8, another operator changes the value of property "WebService URL" for software component "Shared Component between Team1/Team2". In display 900 in FIG. 9, indicator 902 alerts operator "Second DPM User" that a notification has been received. Display 1000 in FIG. 10 shows the notification that is displayed in response to selecting indicator 902 in display 900 in FIG. 9.

Turning to FIGS. 11-15, examples of user interface displays used in a process for incorporating a change in a property of a first version of software into a second version of the software are depicted in accordance with an illustrative embodiment. Displays 1100, 1200, 1300, 1400, and 1500 in FIGS. 11-15 are examples of implementations of displays for user interface 308 in FIG. 3.

Figure 11:
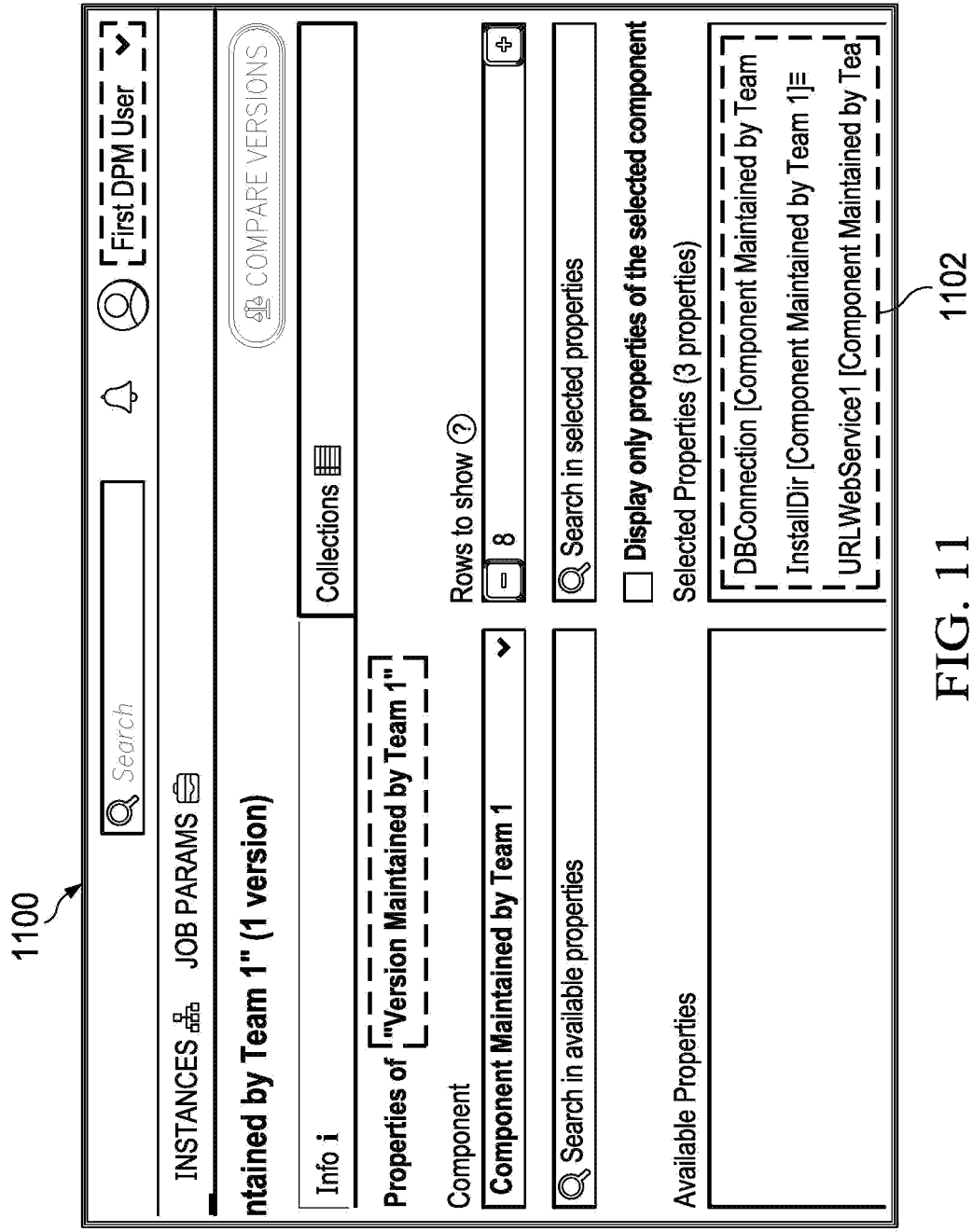
Figure 12:
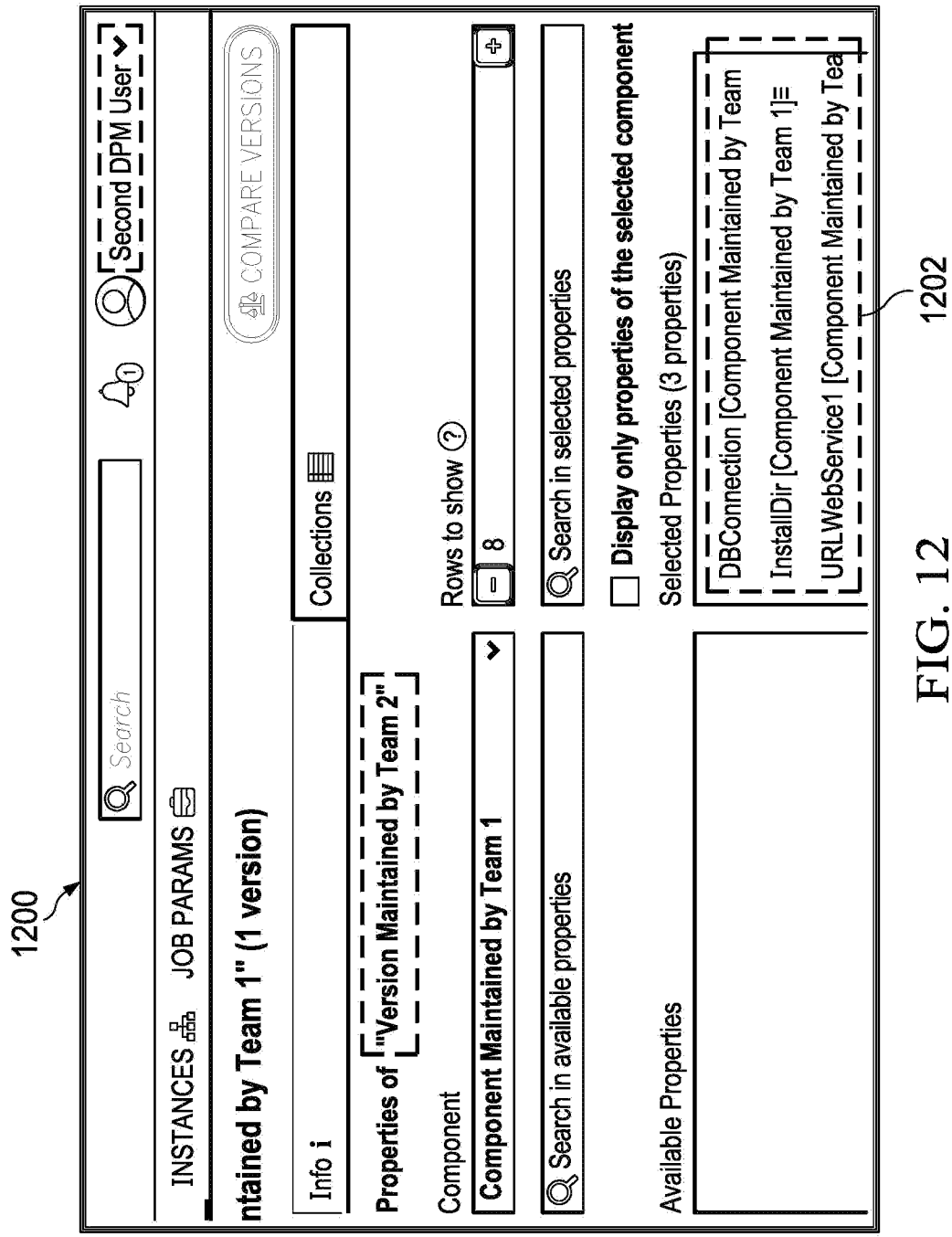
Figure 13:
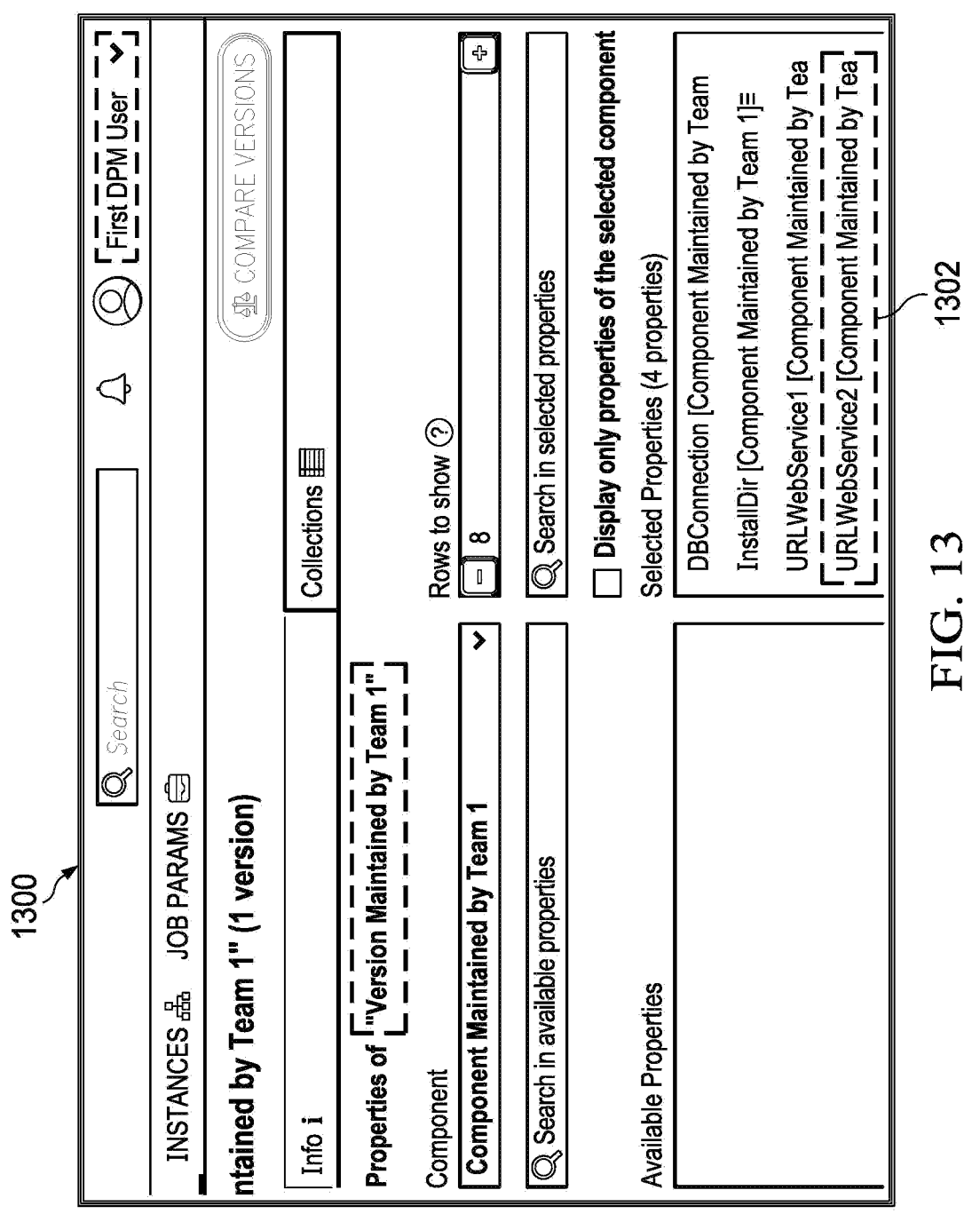
Figure 14:
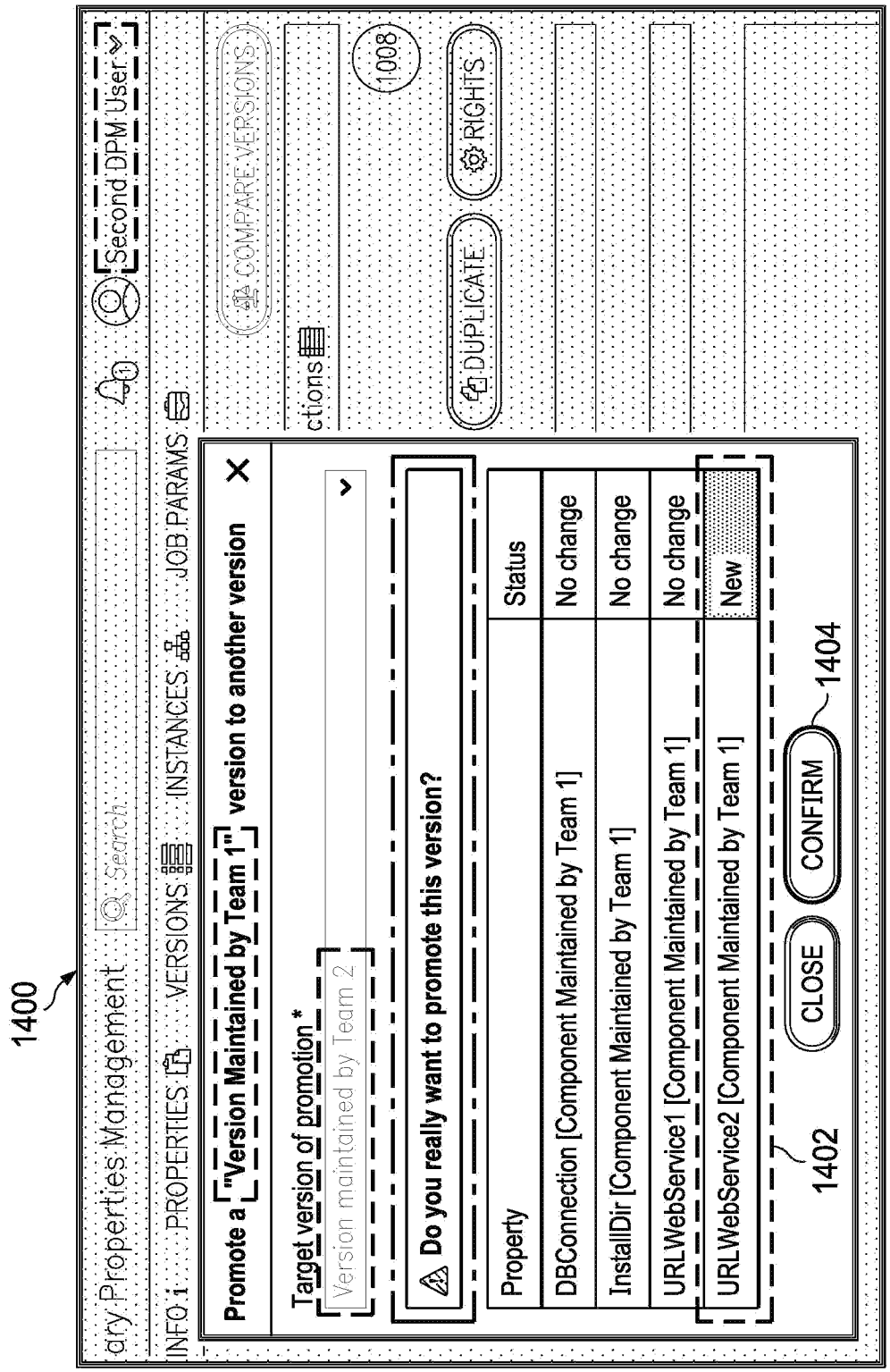
Figure 15:
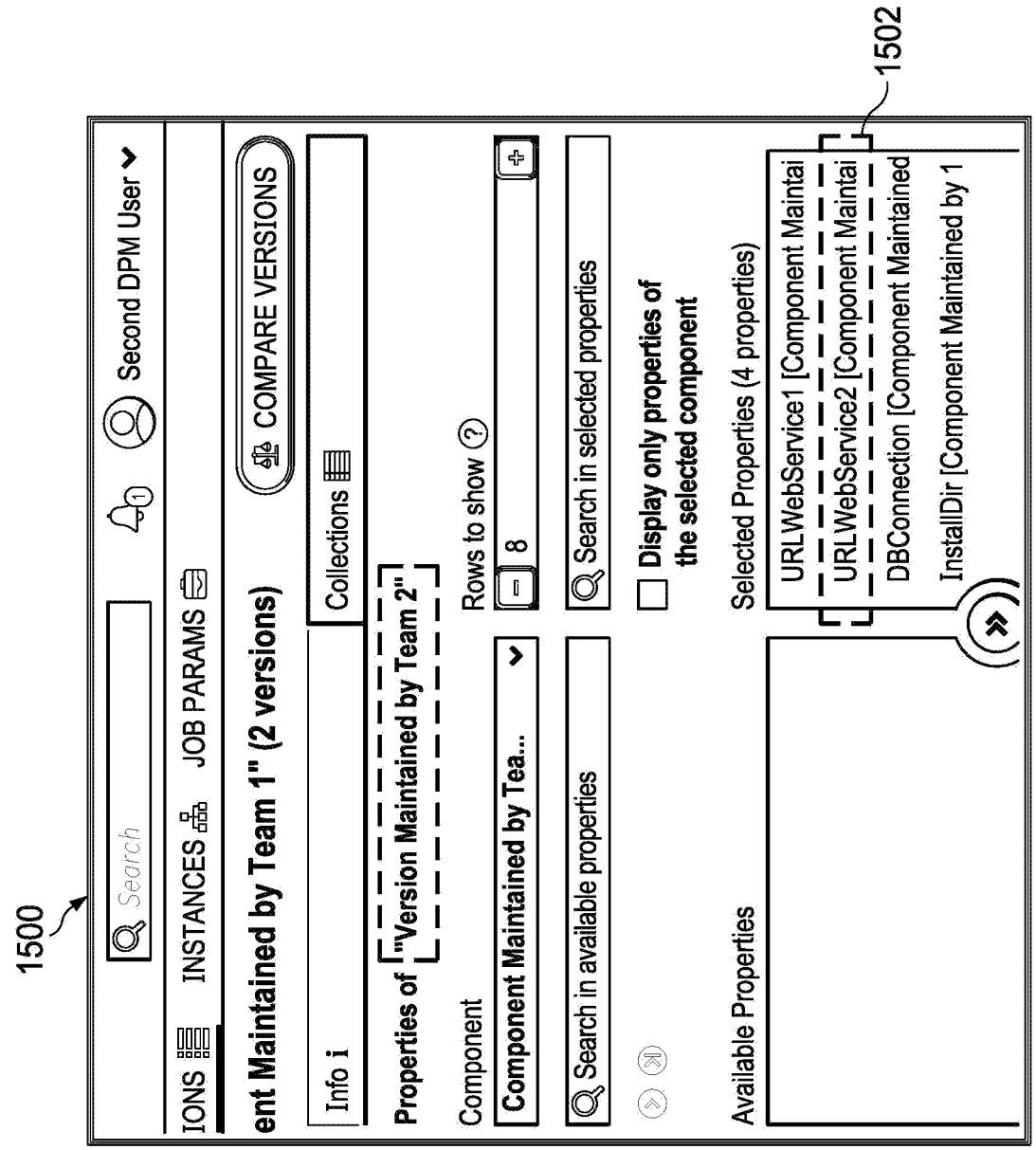

Display 1100 in FIG. 11 shows a list 1102 of the properties for software component "Version Maintained by Team 1". Display 1200 in FIG. 12 shows a list 1202 of the properties for software component "Version Maintained by Team 2". Display 1300 in FIG. 13 shows a change 1302 in the properties for software component "Version Maintained by Team 1" by the operator "First DPM User". Display 1400 in FIG. 14 shows the change 1402 in the property for software component "Version Maintained by Team 1" presented to "Second DPM User" along with prompt 1404 to accept or reject the change. Display 1500 in FIG. 15 shows the change to the properties of software component "Version maintained by Team 2" in response to selecting prompt 1404 in display 1400 in FIG. 14 to accept the change.

Figure 16:
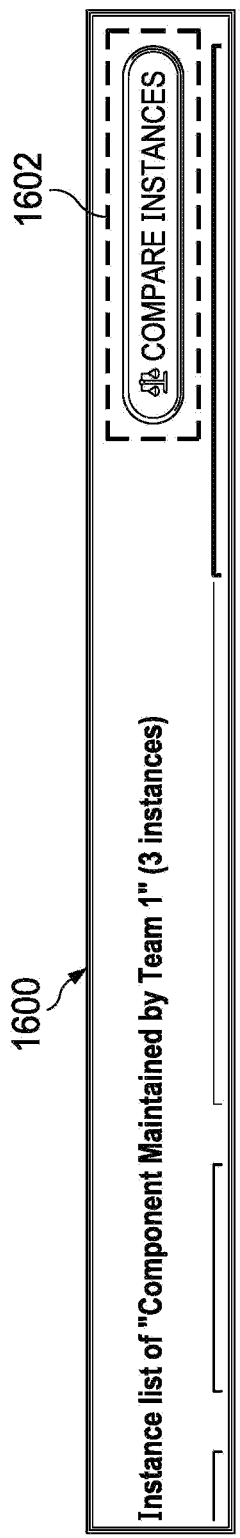
FIGS. 16 and 17 are examples of user interface displays used in a process for comparing properties of software in accordance with an illustrative embodiment.
Figure 17:
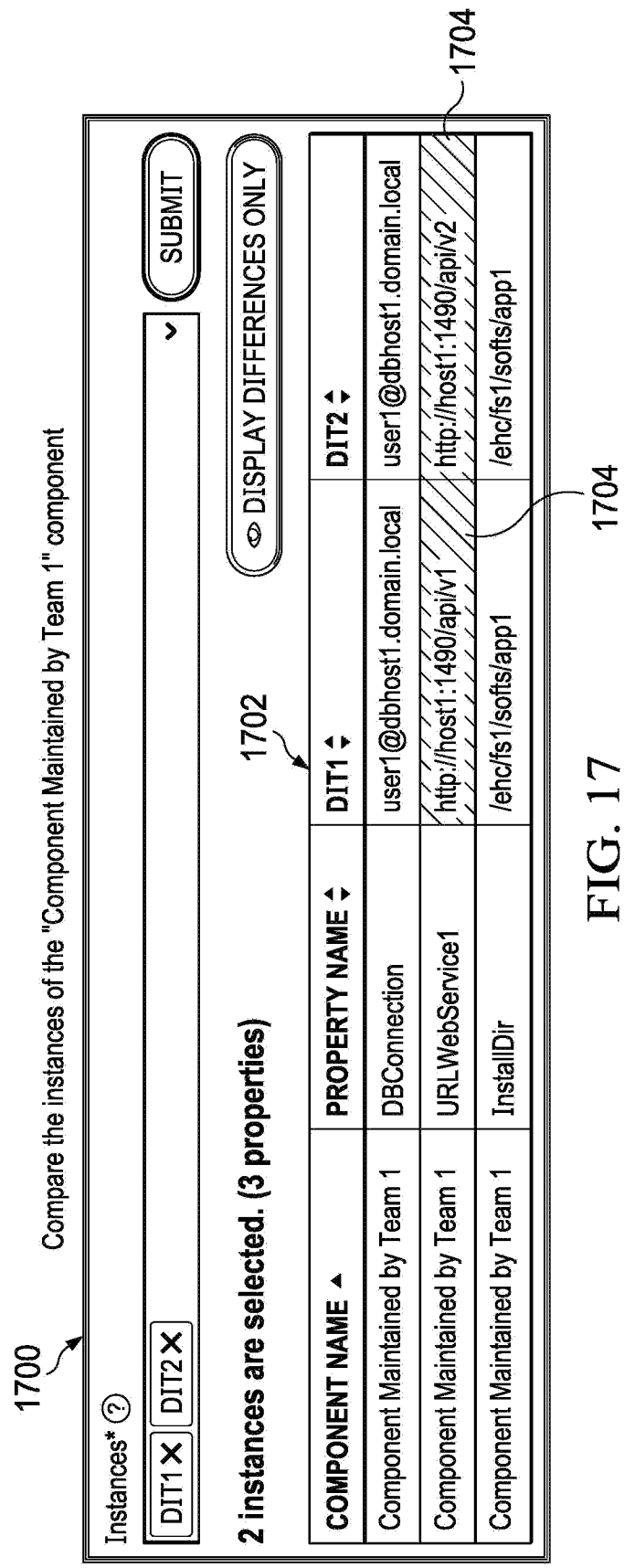

Tuning to FIGS. 16 and 17, examples of user interface displays used in a process for comparing properties of software are depicted in accordance with an illustrative embodiment. Displays 1600 and 1700 in FIGS. 16 and 17 are examples of implementations of displays for user interface 308 in FIG. 3.

In display 1600 in FIG. 16 an operator selects compare instances button 1602 to compare the properties of multiple instances. Display 1700 in FIG. 17 includes a list 1702 of the properties of the instance that were compared. A difference in the properties is highlighted 1704.

Figure 18:
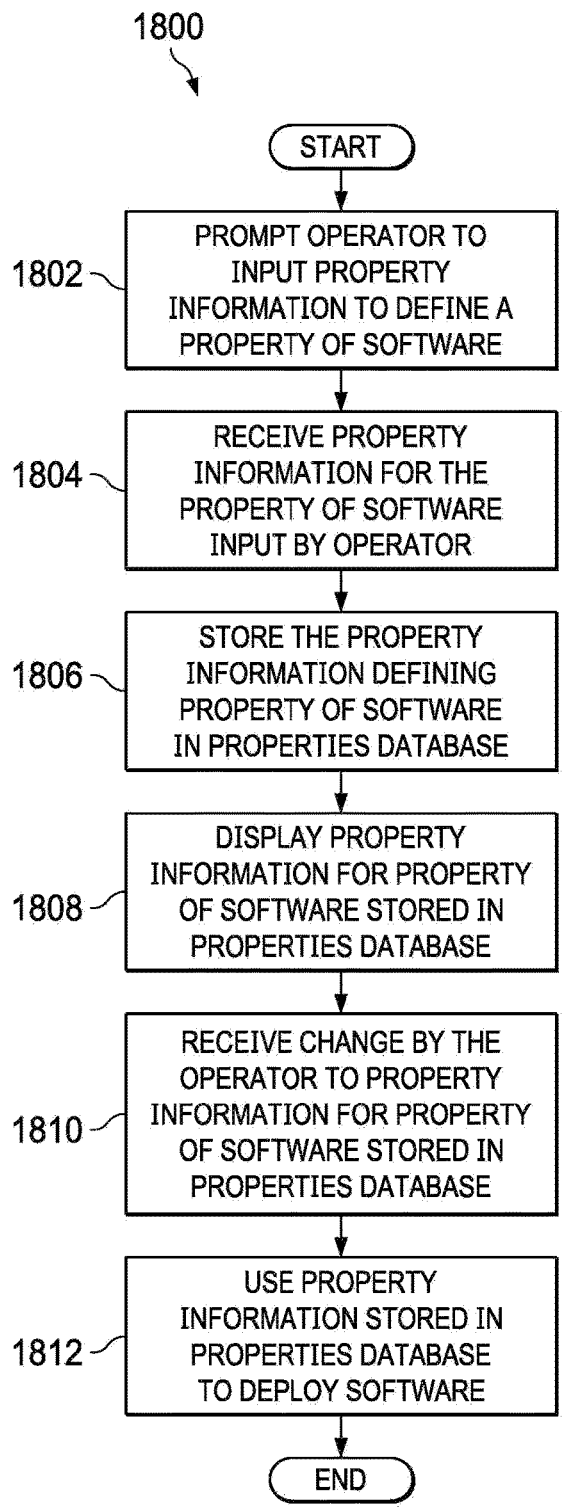
FIG. 18 is an illustration of a flowchart of a process for defining, displaying, and changing properties of software in accordance with an illustrative embodiment.

Turning to FIG. 18, an illustration of a flowchart of a process for defining, displaying, and changing properties of software is depicted in accordance with an illustrative embodiment. Process 1800 may be implemented, for example, in properties management system 300 in FIG. 3.

Process 1800 begins with prompting an operator to input property information to define a property of software (operation 1802). Property information for the property of the software that is input by the operator is received (operation 1804) and stored in a properties database (operation 1806). Property information for a property of software that is stored in the properties database may be displayed (operation 1808). A change by the operator to the property information stored in the properties database may be received (operation 1810). The property information stored in the properties database may be used to deploy the software to run on an operations system (operation 1812), with the process terminating thereafter.

Figure 19:
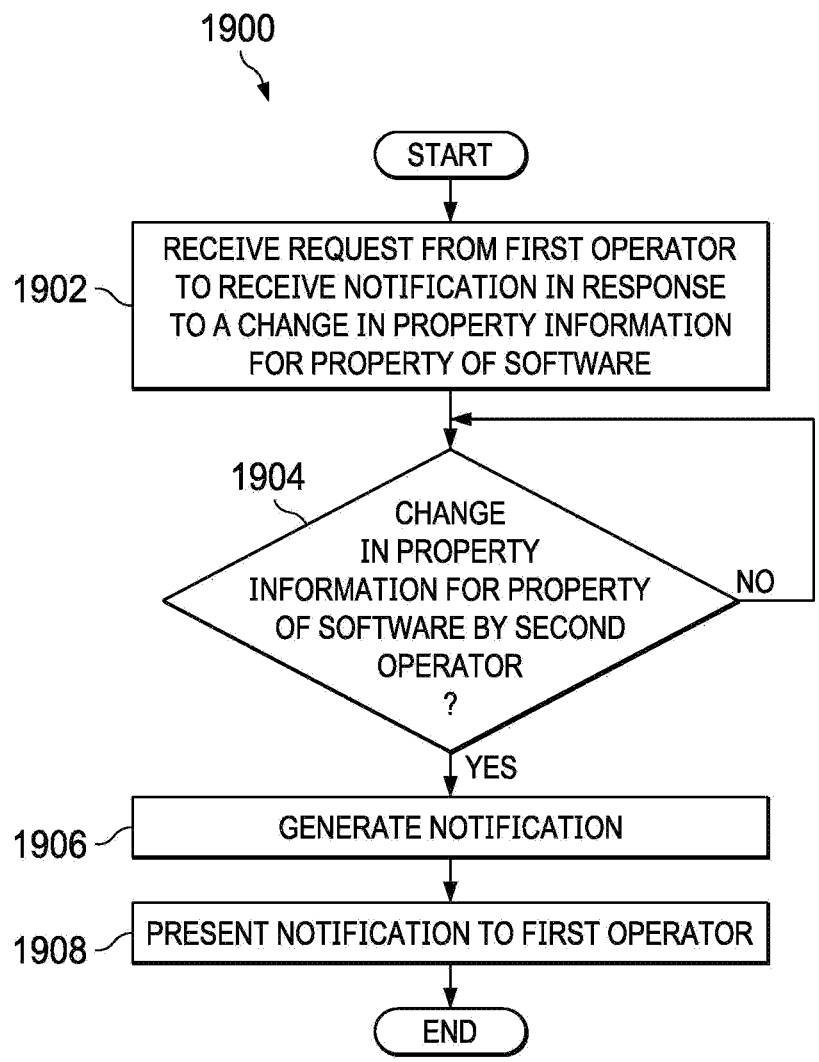
FIG. 19 is an illustration of a flowchart of a process for notifying a first operator of a change in a property of software by a second operator in accordance with an illustrative embodiment.

Turning to FIG. 19, an illustration of a flowchart of a process for notifying a first operator of a change in a property of software by a second operator is in accordance with an illustrative embodiment. Process 1900 may be implemented, for example, in properties management system 300 in FIG. 3.

Process 1900 begins with receiving a request from a first operator to receive a notification in response to a change in the property information defining a property of software (operation 1902). It is then determined whether there is a change in the property information for the property of the software by another operator (operation 1904). In response to determining that there is a change in the property in operation 1904, a notification is generated (operation 1906) and presented to the first operator (operation 1908), with the process terminating thereafter.

Figure 20:
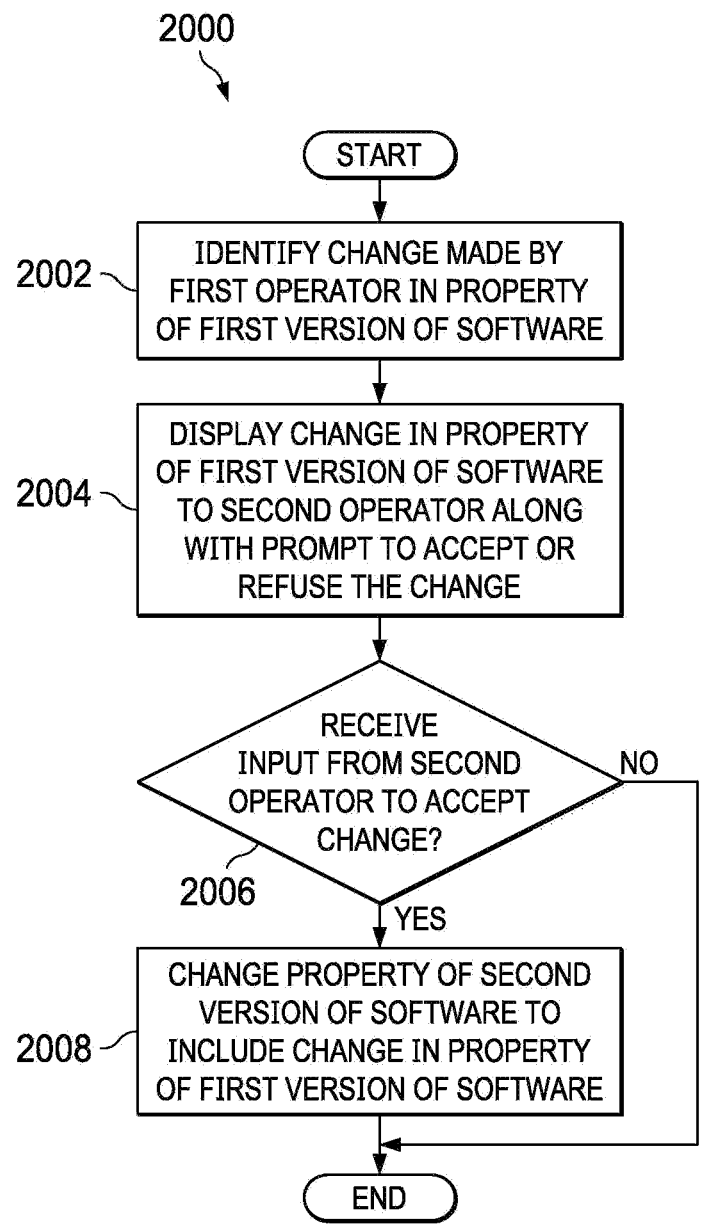
FIG. 20 is an illustration of a flowchart of a process for incorporating a change in a property of a first version of software into a second version of the software in accordance with an illustrative embodiment.

Turning to FIG. 20, an illustration of a flowchart of a process for incorporating a change in a property of a first version of software into a second version of the software is depicted in accordance with an illustrative embodiment. Process 2000 may be implemented, for example, in properties management system 300 in FIG. 3.

Process 2000 begins with identifying a change made by a first operator in a property of a first version of the software (operation 2002). The change in the property of the first version of the software is displayed to a second operator along with a prompt to accept or refuse the change (operation 2004). It is then determined whether input from the second operator to accept the change has been received (operation 2006). In response to a determination at operation 2006 that the change is accepted by the second operator, a property of a second version of the software is changed to include the change in the property of the first version of the software (operation 2008), with the process terminating thereafter. In response to a determination at operation 2006 that the change is not accepted, the process terminates without changing the second version of the software.

Figure 21:
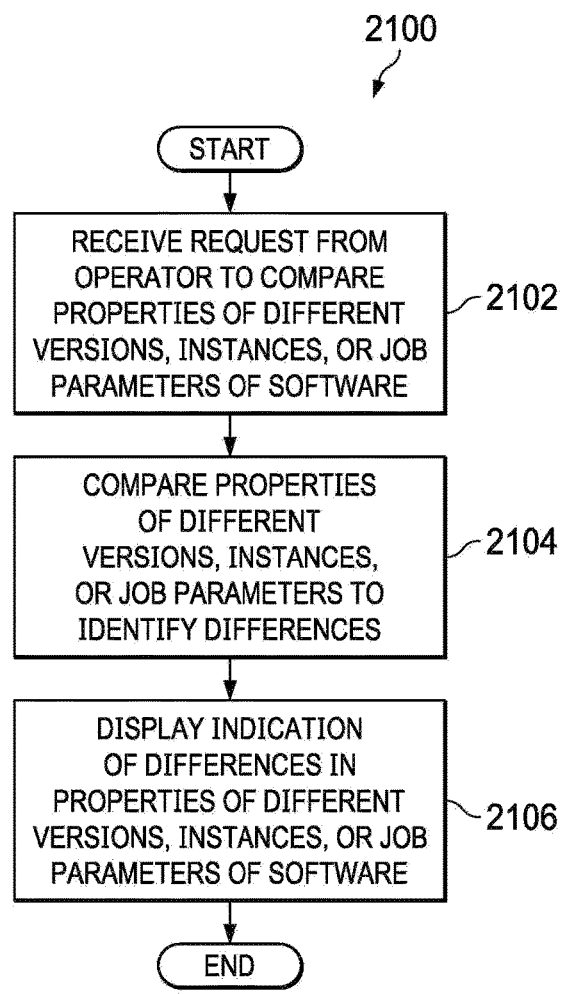
FIG. 21 is an illustration of a flowchart of a process for comparing properties of software in accordance with an illustrative embodiment.

Turning to FIG. 21, an illustration of a flowchart of a process for comparing properties of software in accordance with an illustrative embodiment. Process 2100 may be implemented, for example, in properties management system 300 in FIG. 3.

Process 2100 begins with receiving a request from an operator to compare properties of different versions, instances, or job parameters of software (operation 2102). The properties of the different versions, instances, or job parameters are then compared to identify differences in the properties (operation 2104). An indication of the identified differences in the properties of the different versions, instances, or job parameters is then displayed (operation 2106), with the process terminating thereafter.

Figure 22:
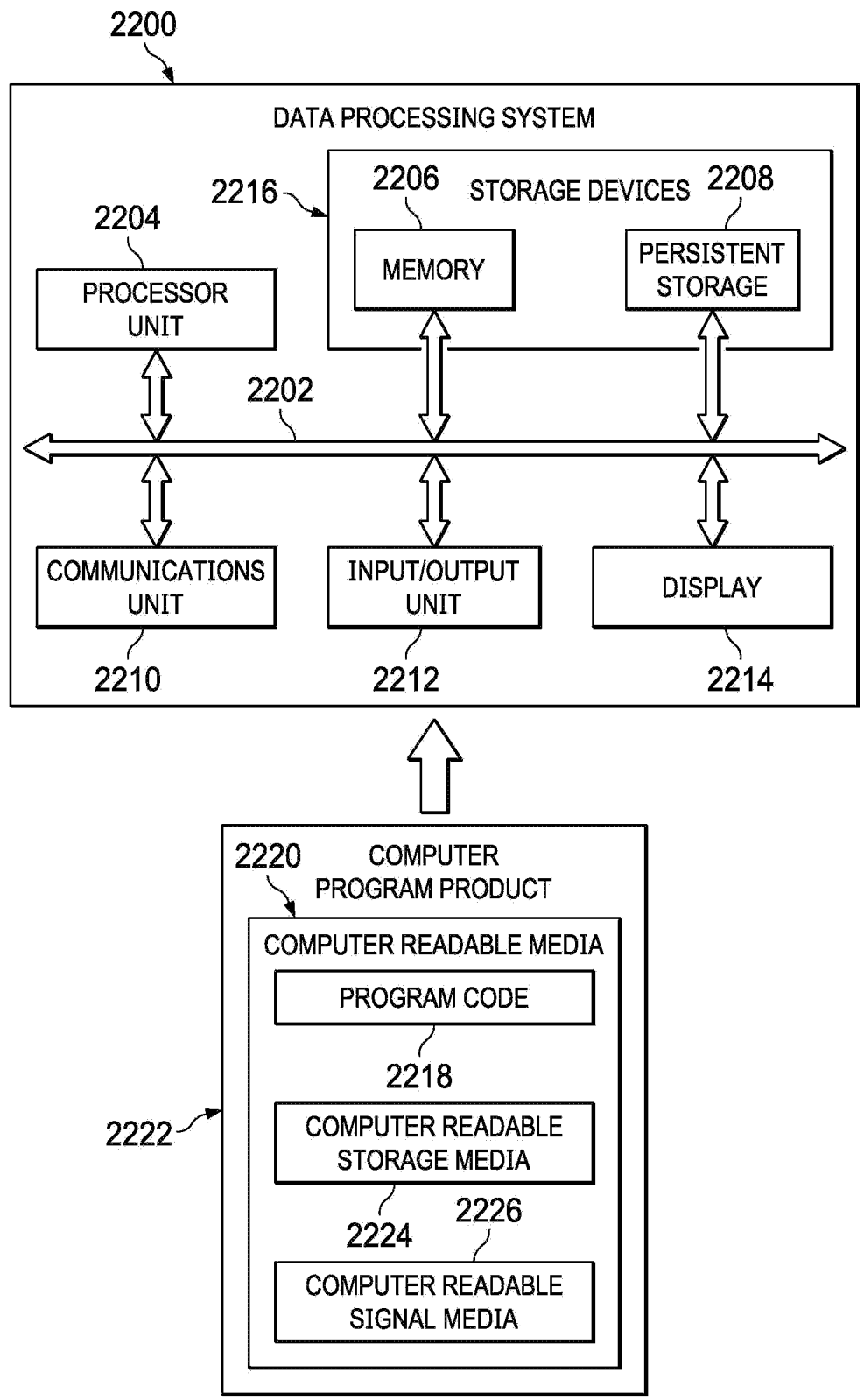
FIG. 22 is an illustration of a block diagram of a data processing system in accordance with an illustrative embodiment.

Turning now to FIG. 22, an illustration of a block diagram of a data processing system is depicted in accordance with an illustrative embodiment. Data processing system 2200 may be used to implement one or more of server computer 104 in FIG. 1, server computer 106 in FIG. 1, client devices 110 in FIG. 1, operations system 212 in FIG. 2, and computer system 302 in FIG. 3. In this illustrative example, data processing system 2200 includes communications framework 2202, which provides communications between processor unit 2204, memory 2206, persistent storage 2208, communications unit 2210, input/output unit 2212, and display 2214. In this example, communications framework 2202 may take the form of a bus system.

Processor unit 2204 serves to execute instructions for software that may be loaded into memory 2206. Processor unit 2204 may be a number of processors, a multi-processor core, or some other type of processor, depending on the particular implementation. In an embodiment, processor unit 2204 comprises one or more conventional general-purpose central processing units (CPUs). In an alternate embodiment, processor unit 2204 comprises one or more graphical processing units (GPUs).

Memory 2206 and persistent storage 2208 are examples of storage devices 2216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2216 may also be referred to as computer-readable storage devices in these illustrative examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that may be connected to data processing system 2200. For example, input/output unit 2212 may provide a connection for user input through at least one of a keyboard, a mouse, or some other suitable input device. Further, input/output unit 2212 may send output to a printer. Display 2214 provides a mechanism to display information to a user.

Instructions for at least one of the operating system, applications, or programs may be located in storage devices 2216, which are in communication with processor unit 2204 through communications framework 2202. The processes of the different embodiments may be performed by processor unit 2204 using computer-implemented instructions, which may be located in a memory, such as memory 2206.

These instructions are referred to as program code, computer-usable program code, or computer-readable program code that may be read and executed by a processor in processor unit 2204. The program code in the different embodiments may be embodied on different physical or computer-readable storage media, such as memory 2206 or persistent storage 2208.

Program code 2218 is located in a functional form on computer-readable media 2220 that is selectively removable and may be loaded onto or transferred to data processing system 2200 for execution by processor unit 2204. Program code 2218 and computer-readable media 2220 form computer program product 2222 in these illustrative examples. In one example, computer-readable media 2220 may be computer-readable storage media 2224 or computer-readable signal media 2226.

In these illustrative examples, computer-readable storage media 2224 is a physical or tangible storage device used to store program code 2218 rather than a medium that propagates or transmits program code 2218. Alternatively, program code 2218 may be transferred to data processing system 2200 using computer-readable signal media 2226.

Computer-readable signal media 2226 may be, for example, a propagated data signal containing program code 2218. For example, computer-readable signal media 2226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media" can be singular or plural. For example, program code 2218 can be located in computer-readable media 2220 in the form of a single storage device or system. In another example, program code 2218 can be located in computer-readable media 2220 that is distributed in multiple data processing systems. In other words, some instructions in program code 2218 can be located in one data processing system while other instructions in program code 2218 can be located in another data processing system. For example, a portion of program code 2218 can be located in computer-readable media 2220 in a server computer while another portion of program code 2218 can be located in computer-readable media 2220 located in a set of client computers.

The different components illustrated for data processing system 2200 are not meant to provide architectural limitations to the manner in which different embodiments may be implemented. The different illustrative embodiments may be implemented in a data processing system including components in addition to or in place of those illustrated for data processing system 2200. Other components shown in FIG. 22 can be varied from the illustrative examples shown. The different embodiments may be implemented using any hardware device or system capable of running program code 2218.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising one or more memory devices storing instructions thereon that, when executed by one or more processors, cause the one or more processors to:
provide one or more user interfaces to control properties of software, the one or more user interfaces accessible to a plurality of computing devices that have access to the software;
display, via the one or more user interfaces, a prompt to a first computing device of the plurality of computing devices for a first input to define a property of the software;
receive, via the one or more user interfaces, responsive to the prompt, the first input to define the property of the software from the first computing device;
provide, via the one or more user interfaces, information associated with the first input;
receive, from the first computing device subsequent to receipt of the first input, a change to one or more aspects of the first input which reflects an update to a definition of the property of the software;
display, via the one or more user interfaces, to a second computing device of the plurality of computing devices, responsive to receipt of the change to the one or more aspects of the first input, a message that includes:
the change to the one or more aspects of the first input; and a prompt to confirm the change to the one or more aspects of the first input;

receive, responsive to display of the message, from the second computing device, a second input with confirmation of the change to the one or more aspects of the first input; and display, via the one or more user interfaces to at least one computing device of the plurality of computing devices, responsive to receipt of the second input, a first indication of the update to the definition of the property of the software and a second indication which indicates that the change to the one or more aspects of the first input was (1) received from the first computing device and (2) confirmed by the second computing device.

2. The system of claim 1, wherein the first input to define the property of the software is stored in a database, and wherein the instructions further cause the one or more processors to:

enable the at least one computing device of the plurality of computing devices to use the first input stored in the database to deploy the software to a second system for running of the software on the second system.

3. The system of claim 1, wherein the first input comprises a first identifier to identify the property of the software and a second identifier to identify a value of the property of the software.

4. The system of claim 1, wherein the property of the software is a property of a component of the software, and wherein the instructions further cause the one or more processors to:

provide, via the one or more user interfaces, a second prompt to the first computing device for a third input to identify the component of the software; and receive, via the one or more user interfaces from the first computing device and responsive to the second prompt, an identifier to identify the component of the software.

5. The system of claim 4, wherein the instructions further cause the one or more processors to:

enable, via the one or more user interfaces, the at least one computing device of the plurality of computing devices to define different versions of the component of the software.

6. The system of claim 5, wherein the instructions further cause the one or more processors to:

compare the different versions of the component of the software to identify differences in one or more sets of information for the different versions of the component; and display, via the one or more user interfaces, an indication of the differences in the one or more sets of information for the different versions of the component.

7. The system of claim 4, wherein the instructions further cause the one or more processors to:

enable, via the one or more user interfaces, the at least one computing device of the plurality of computing devices to define different instances of the component of the software, wherein the different instances of the component comprise different values for properties of the component; and store first information comprising different values for the properties of the different instances of the component of the software.

8. The system of claim 7, wherein the instructions further cause the one or more processors to:

compare the different instances of the component of the software to automatically identify differences in the first information for the different instances of the component; and display, via the one or more user interfaces, an indication of the differences in the first information for the different instances of the component.

9. The system of claim 4, wherein the instructions further cause the one or more processors to:

enable, via the one or more user interfaces, the at least one computing device of the plurality of computing devices to define different job parameters, wherein the different job parameters define different components for the software; and store, in a database, information defining the different job parameters.

10. The system of claim 9, wherein the instructions further cause the one or more processors to:

compare the different job parameters to automatically identify differences in the different job parameters; and display, via the one or more user interfaces, an indication of the differences in the different job parameters.

11. The system of claim 1, wherein the instructions further cause the one or more processors to:

receive, via the one or more user interfaces, a request from a third computing device of the plurality of computing devices to provide a notification in response to the change to the one or more aspects of the first input;

receive, responsive to receipt of the request, from the second computing device, an identification of the change to the one or more aspects of the first input;

generate, responsive to receipt of the identification, the notification; and display, via the one or more user interfaces, responsive to generation of the notification, the notification to the third computing device.

12. A method, comprising:

providing, by one or more processing circuits, one or more user interfaces to control properties of software, the one or more user interfaces accessible to a plurality of computing devices that have access to the software;

displaying, by the one or more processing circuits, via the one or more user interfaces, a prompt to a first computing device of the plurality of computing devices for a first input to define a property of the software;

receiving, by the one or more processing circuits, via the one or more user interfaces, responsive to the prompt, the first input to define the property of the software from the first computing device;

providing, by the one or more processing circuits, via the one or more user interfaces, information associated with the first input;

receiving, by the one or more processing circuits, from the first computing device subsequent to receipt of the first input, a change to one or more aspects of the first input which reflects an update to a definition of the property of the software;

displaying, by the one or more processing circuits, via the one or more user interfaces, to a second computing device of the plurality of computing devices, responsive to receipt of the change to the one or more aspects of the first input, a message that includes:

the change to the one or more aspects of the first input; and a prompt to confirm the change to the one or more aspects of the first input;

receiving, by the one or more processing circuits, responsive to displaying the message, from the second computing device, a second input with confirmation of the change to the one or more aspects of the first input; and displaying, by the one or more processing circuits, via the one or more user interfaces to at least one computing device of the plurality of computing devices, responsive to receipt of the second input, a first indication of the update to the definition of the property of the software and a second indication which indicates that the change to the one or more aspects of the first input was (1) received from the first computing device and (2) confirmed by the second computing device.

13. The method of claim 12, wherein the first input to define the property of the software is stored in a database, and further comprising:

enabling, by the one or more processing circuits, the at least one computing device of the plurality of computing devices to use the first input stored in the database to deploy the software to a second system for running of the software on the second system.

14. The method of claim 12, wherein the first input comprises a first identifier to identify the property of the software and a second identifier to identify a value of the property of the software.

15. The method of claim 12, wherein the property of the software is a property of a component of the software, and further comprising:

providing, by the one or more processing circuits, via the one or more user interfaces, a second prompt to the first computing device for a third input to identify the component of the software; and receiving, by the one or more processing circuits, via the one or more user interfaces from the first computing device and responsive to the second prompt, an identifier to identify the component of the software.

16. The method of claim 15, further comprising:

enabling, by the one or more processing circuits, via the one or more user interfaces, the at least one computing device of the plurality of computing devices to define different versions of the component of the software.

17. A non-transitory computer readable storage media having instructions stored thereon that, when executed by one or more processors, cause the one or more processors to implement operations comprising:

providing one or more user interfaces to control properties of software, the one or more user interfaces accessible to a plurality of computing devices that have access to the software;

displaying, via the one or more user interfaces, a prompt to a first computing device of the plurality of computing devices for a first input to define a property of the software;

receiving, via the one or more user interfaces, responsive to the prompt, the first input to define the property of the software from the first computing device;

providing, via the one or more user interfaces, information associated with the first input;

receiving, from the first computing device subsequent to receipt of the first input, a change to one or more aspects of the first input which reflects an update to a definition of the property of the software;

displaying, via the one or more user interfaces, to a second computing device of the plurality of computing devices, responsive to receipt of the change to the one or more aspects of the first input, a message that includes:

the change to the one or more aspects of the first input; and a prompt to confirm the change to the one or more aspects of the first input;

receiving, responsive to displaying the message, from the second computing device, a second input with confirmation of the change to the one or more aspects of the first input; and displaying, via the one or more user interfaces to at least one computing device of the plurality of computing devices, responsive to receipt of the second input, a first indication of the update to the definition of the property of the software and a second indication which indicates that the change to the one or more aspects of the first input was (1) received from the first computing device and (2) confirmed by the second computing device.

18. The non-transitory computer readable storage media of claim 17, wherein the first input to define the property of the software is stored in a database, and wherein the instructions further cause the one or more processors to perform operations comprising:

enabling the at least one computing device of the plurality of computing devices to use the first input stored in the database to deploy the software to a second system for running of the software on the second system.

19. The non-transitory computer readable storage media of claim 17, wherein the first input comprises a first identifier to identify the property of the software and a second identifier to identify a value of the property of the software.

20. The non-transitory computer readable storage media of claim 17, wherein the property of the software is a property of a component of the software, and wherein the instructions further cause the one or more processors to perform operations comprising:

providing, via the one or more user interfaces, a second prompt to the first computing device for a third input to identify the component of the software; and receiving, via the one or more user interfaces, from the first computing device and responsive to the second prompt, an identifier to identify the component of the software.

* * * * *